US006327950B1

(12) United States Patent
Huhn et al.

(10) Patent No.: US 6,327,950 B1
(45) Date of Patent: Dec. 11, 2001

(54) LONGITUDINAL CUTTING MACHINE HAVING BLADE HOLDERS THAT ARE INDIVIDUALLY REMOVABLE FROM THE TRAVERSE

(75) Inventors: Erhard Huhn, Bergisch Gladbach; Winfried Miebach, Engelskirchen-Loope; Rudolf Supe-Dienes, Overath-Vilkerath, all of (DE)

(73) Assignee: Dienes Werke für Maschinenteile GmbH & Co. KG (DE)

( * ) Notice: Subject to any disclaimer, the term of this patent is extended or adjusted under 35 U.S.C. 154(b) by 0 days.

(21) Appl. No.: 09/006,701

(22) Filed: Jan. 14, 1998

(30) Foreign Application Priority Data

Jan. 14, 1997 (DE) .............................................. 197 00 941

(51) Int. Cl.[7] .............................. B23D 19/00; B23D 1/14
(52) U.S. Cl. .................................. 83/481; 83/482; 83/504
(58) Field of Search .............................. 83/481, 482, 504, 83/508.2, 508.3, 698.61, 425.4

(56) References Cited

U.S. PATENT DOCUMENTS

| | | | | |
|---|---|---|---|---|
| 246,892 | * | 9/1881 | Marschall | 83/482 |
| 3,185,040 | * | 5/1965 | Printz et al. | 83/482 |
| 3,186,282 | * | 6/1965 | Waterhouse | 83/497 |
| 3,834,258 | * | 9/1974 | Zumstein | 83/504 |
| 3,892,156 | * | 7/1975 | Johnstone | 83/482 |
| 4,438,673 | * | 3/1984 | Noffke et al. | 83/482 |
| 4,570,518 | * | 2/1986 | Burmeister et al. | 83/504 |
| 4,649,782 | * | 3/1987 | Cavagna | 83/425.4 |
| 4,741,234 | * | 5/1988 | Colombo | 83/481 |
| 5,025,693 | * | 6/1991 | Tidland et al. | 83/482 |
| 5,054,355 | * | 10/1991 | Tisse et al. | 83/482 |
| 5,546,840 | * | 8/1996 | Supe-Dienes | 83/508.3 |

FOREIGN PATENT DOCUMENTS

| | | |
|---|---|---|
| 3437995 | 5/1985 | (DE) . |
| 3544284 | 6/1987 | (DE) . |
| 4215170 | 11/1993 | (DE) . |

* cited by examiner

*Primary Examiner*—Kenneth E. Peterson
*Assistant Examiner*—Stephen Choi
(74) *Attorney, Agent, or Firm*—R. W. Becker & Associates; R. W. Becker

(57) ABSTRACT

A longitudinal cutting machine having a plurality of blade holders disposed on at least one traverse that extends over the length of the longitudinal cutting machine is provided. So that the blade holders can each be removed independently of one another from the traverse, the individual blade holders are releasably mounted by two spaced-apart claws on associated profiled members that are mounted on the traverse. One of the claws is movable relative to the blade holder and can be fixed in position by means of an adjusting unit. When the adjusting unit is loosened, then by pivoting of the blade holder about one of the two claws, which pivoting is made possible by a deflecting movement of the movable claw, the other claw is released from the associated profiled member and the blade holder is removable from the traverse.

6 Claims, 2 Drawing Sheets

LONGITUDINAL CUTTING MACHINE HAVING BLADE HOLDERS THAT ARE INDIVIDUALLY REMOVABLE FROM THE TRAVERSE

BACKGROUND OF THE INVENTION

The present invention relates to a longitudinal cutting machine having a plurality of blade holders disposed on at least one traverse that extends over the length of the longitudinal cutting machine.

With known longitudinal cutting machines of this type (see for example DE 34 37 995 A1), a plurality of blade holders are mounted on a continuous traverse, whereby the blade holders positively engage the traverse by means of rollers that are secured to fixed arms, and are thus displaceable along the traverse via the roller guidance. Alternative possibilities for securing blade holders on traverses are known where the blade holders completely surround the traverses or are guided and held on the traverse by means of interlocking configurations, for example, a tongue and groove arrangement.

Such a mounting of the blade holders on the traverse of a longitudinal cutting machine has the drawback that an individual blade holder cannot be separately removed from the traverse, for example in order to undertake repairs. Rather, with the heretofore known longitudinal cutting machines having blade holders with linear guidance it is necessary to also shift all of the blade holders that are disposed between the blade holder that is to be removed and one end of the traverse to that end and to remove them all, which involves a corresponding disassembly and subsequent reassembly cost.

It is therefore an object of the present invention to provide a longitudinal cutting machine of the aforementioned general type where each blade holder can be individually removed from the traverse of the cutting machine.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
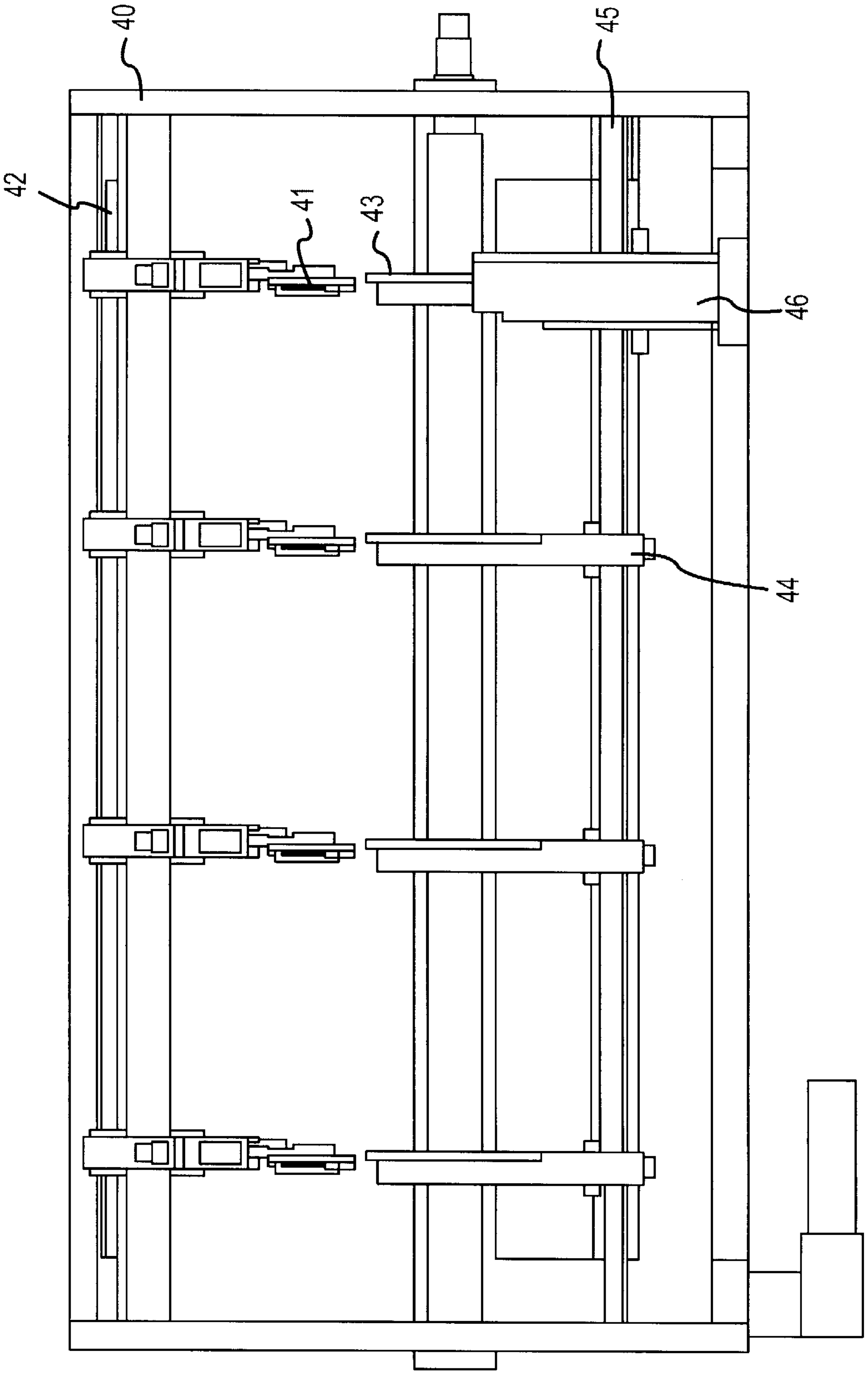
FIG. 1 shows a front view of one exemplary embodiment of an inventive longitudinal cutting machine.

The longitudinal cutting machine of the present invention is characterized primarily in that the individual blade holders are releasably held on profiled members mounted on the traverse by means of two spaced-apart claws, wherein one of the claws is movable relative to the blade holder and can be fixed in position by means of an adjusting means, and wherein when the adjusting means is loosened, then by means of a pivoting of the blade holder about one of the two claws, which pivoting is made possible by a deflecting movement of the movable claw, the other of the claws is released from its associated profiled member and the blade holder can be removed from the traverse. Thus, the present invention has the advantage that after loosening of the adjusting means the blade holder can be pivoted about the profiled member, whereby the claw that is movable relative to the blade holder provides the necessary clearance for this purpose, so that the claw that is the outer claw in the pivoting movement is respectively released from the profiled member; in the same manner, the blade holder can again be mounted on the traverse.

Pursuant to one specific embodiment of the present invention, with respect to the configuration of the profiled member and the pertaining claws, the profiled member has a rectangular sectional shape, surfaces of which that face away from one another being respectively provided with an indentation or recess for receiving hook-shaped projections of the claws that are to be mounted on the profiled member. Pursuant to further specific embodiments of the invention, either a single profiled rail having respective outer profiled sectional shapes and associated recess surfaces can be provided, or two profiled rails with recess surfaces disposed thereon can be provided.

The mirror symmetrical claws are essentially U-shaped and embrace the pertaining profiled member, whereby that leg of the claws that embraces the surfaces of the profiled member that is provided with the recess is provided with the hook-shaped projection, and the other U leg, which projects in the direction of the profiled member, is shorter and is provided in an inner corner with an inclined surface such that when the blade holder is pivoted relative to the profiled member the claw slides off and is released from the profiled rail.

Pursuant to one specific embodiment of the present invention, the movability of one of the two claws that is mounted on the blade holder is effected in that the movable claw, on that side thereof that faces away from the profiled member, is provided with an extension that engages in a rectangular recessed portion of the blade holder, wherein in the region of its center line, which intersects the profiled member, the extension rests against the surface of the recessed portion and from here tapers in a trapezoidal shape toward both sides accompanied by the formation of free spaces in the corner regions of the recessed portion, so that the extension is pivotable in both directions about the point of engagement in the recessed portion.

Pursuant to another specific embodiment of the present invention with respect to the configuration of adjusting means for fixing the position of or effecting release of the movable claw, the adjusting means, which acts upon the movable claw, comprises a linearly displaceable slide means that is supported on the one hand against the claw and on the other hand by means of an inclined surface against the blade holder. This slide means biases the movable claw in the fixed position against the profiled member, and by means of an adjusting screw, which effects the linear movement of the slide means, is adjustable between its fixed position and a release position for the movable claw. In this connection, pursuant to another specific embodiment of the present invention, it is expedient for the movable claw to be biased against the adjusting means by a spring that is supported against the blade holder.

To the extent that the present invention relates to longitudinal cutting machines wherein the individual blade holders are displaceably disposed on the traverse, it is proposed pursuant to a further specific embodiment of the present invention that in order to improve the displaceability of the blade holders on the traverse, ball bearings be disposed between the glide surfaces of the profiled members and the claws.

Further specific features of the present invention will be described in detail subsequently.

DESCRIPTION OF PREFERRED EMBODIMENTS

Referring now to the drawings in detail, FIG. 1 illustrates a straight-line or longitudinal cutting machine 40 in which individual upper blades 41 are guided on a linear guide means 42. Also disposed in the longitudinal cutting machine 40 are lower blades 43 that are associated with the individual upper blades 41 and which are carried by blade holders 44. The blade holders 44 for the lower blades 43 are also displaceably disposed on a crossbar or traverse 45. For this purpose, a positioning means 46 is provided by means of which the individual lower blades 43 can be displaced; the positioning means is, however, not the subject matter of the present invention.

Figure 2:
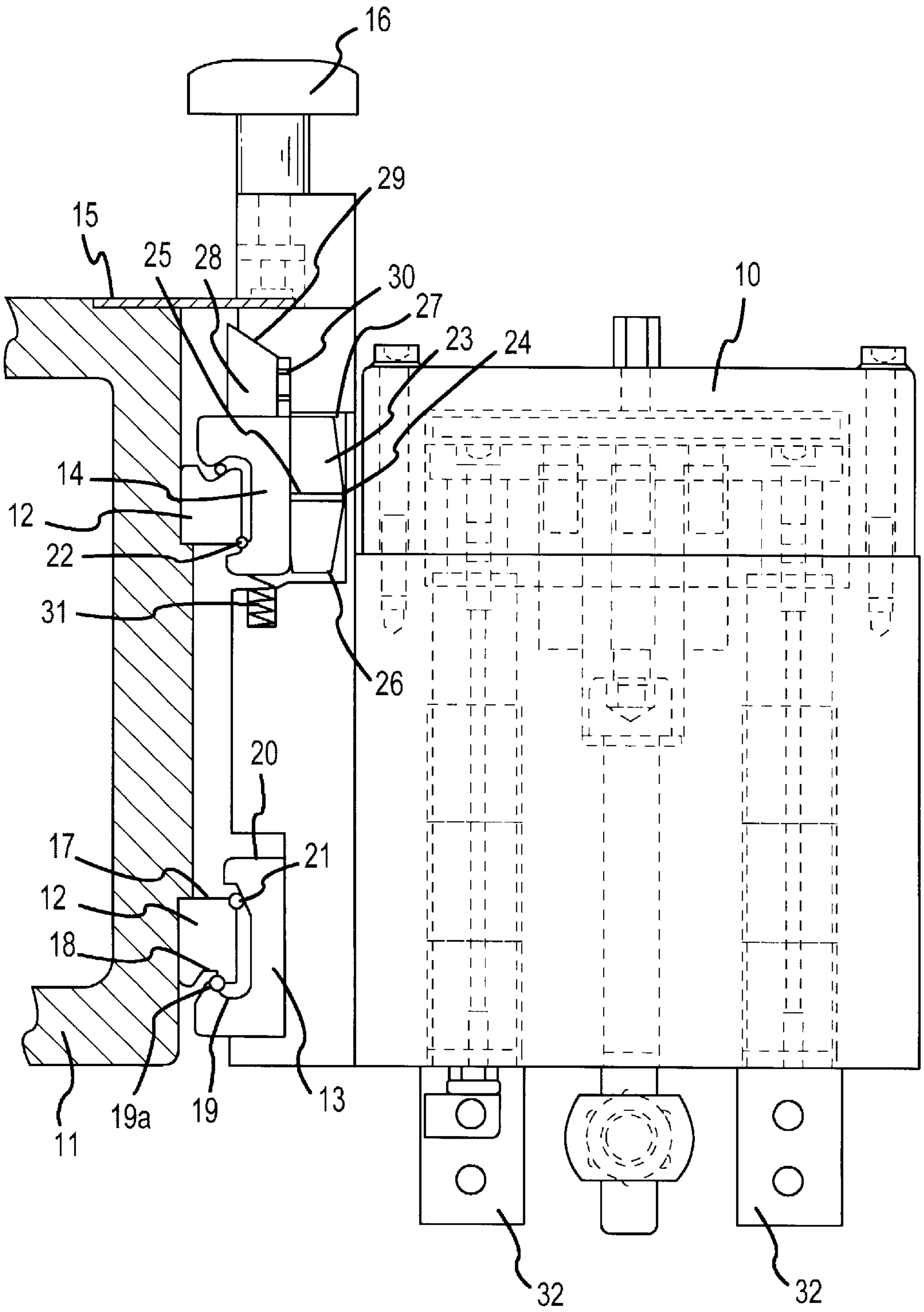
FIG. 2 is an enlarged partial view of a blade holder mounted on a traverse, the pertaining blade not being illustrated.

The enlarged illustration of FIG. 2 shows a blade holder 10, along with the lowering mechanism disposed therein, for the blades that are held on the lower attachment means 32 but are not illustrated in FIG. 2. A blade holder 10 is mounted on a crossbar or traverse 11 that forms the linear guide means 42. In particular, grasping means or claws 13, 14 that are mounted on the blade holder respectively grasp associated profiled members 12 that are secured to the traverse 11 and that in the illustrated embodiment are embodied as two profiled rails that are secured at a distance from one another on the traverse 11.

As can be seen from FIG. 2, each of the profiled members or rails 12 has a rectangular sectional shape 17 that on each of the surfaces that is disposed outwardly and facing away from one another is provided within an indentation or recess 18.

The claws 13, 14, which essentially embrace the profiled rails 12, have a U-shaped configuration. A first U leg 19 is provided with a hook 19*a* that faces in the direction of the recess 18 and is associated with that surface of the profiled rail 12 that is provided with the recess 18. The other U leg 20 of the respective claw 13, 14 is associated with the opposite surface of the profiled rail 12 and is shorter; the inner corner region of this leg 20 is provided with an inclined surface 21 so that when the claws 13, 14 are pivoted about the profiled rail 12, this short U leg 20 can slide from the corner of the profiled rail 12. To facilitate the displaceability, respective balls 22 are disposed in the corner region in the vicinity of the inclined surfaces 21 on the one hand and at the contact surfaces between the hooks 19*a* and the recesses 18 of the profiled rails 12 on the other hand; these balls 22 facilitate displacement of the claws 13, 14 relative to the profiled rails 12.

In the illustrated embodiment, the reference numeral 13 denotes the lower claw, which is fixedly disposed on the blade holder 10. In contrast, the upper claw 14 is movable relative to the blade holder 10 in order to provide the necessary play for the pivoting of the blade holder during removal or mounting.

For this purpose, the movable claw 14 is provided with an extension 23 on that side thereof that is disposed opposite the profiled rail 12; this extension 23 engages a rectangular recessed portion 24 formed in the blade holder 10. At a point on the center line 25 of the extension 23, which center line intersects the profiled rail 12, the extension 23 rests against the inner surface of the recessed portion 24 in the blade holder 10; from this point, the extension 23 tapers symmetrically into a trapezoidal shape 26, as a consequence of which free spaces 27 are formed in the corner regions of the recessed portion 24 to permit cocking or tilting of the extension 23 in the recessed portion 24.

Though not illustrated in detail, the extension 23 can either be fixedly attached to the movable claw 14 or can alternatively also be inserted into an elongated slot and can be held therein, in order to appropriately improve assembly and movability.

In its arresting position, the movable claw 14 is pressed against the profiled rail 12 by an adjusting or positioning means, which is formed by slide means 28 that on the one hand rest against the outer surface of the movable claw 14 and on the other hand rest against the blade holder 10 by means an associated inclined surface 29. By means of an indicated adjusting screw 30, the slide means 28 is linearly movable between its arresting position and a release position for the movable claw 14. The claw 14 is biased against the slide means 28 by a spring 31 that is supported against the blade holder 10.

In the embodiment illustrated in FIG. 2, the blade holder 10 is shown in its position arrested on the traverse 11, whereby after loosening of the setscrew 16, the blade holder 10 can be displaced via the ball-bearings 22.

If the blade holder 10 is to be removed from the traverse 11, the slide means 28 is shifted outwardly by the adjusting screw 30, in other words toward the left in the drawing, so that the movable claw 14 is provided with play or clearance. If the blade holder 10 is now pivoted, for example in a clockwise direction, with the point of rotation being established by the lower, fixed claw 13, the movable claw 14 can pivot in a counter clockwise direction into the recessed portion 24 until the trapezoid line 26 rests against the inner edge of the recessed portion 24. In this connection, the lower U leg 20 of the movable claw 14 slides off from the profiled rail 12, so that the spring 31 can shift the movable claw 14 upwardly in the direction of the shifted slide means 28. In so doing, the upper hook 19*a* of the movable claw 14 is freed from the profiled rail 12 and at the same time the short U leg 20 of the lower fixed claw 13 also slides away from the profiled rail 12 due to the inclined surface 21, so that the blade holder 10 can be removed from the profiled rails 12 of the traverse 11.

Due to the symmetrical configuration of the profiled rails 12 as well as the two claws 13, 14 on the one hand, and of the extension 23 of the movable claw 14 in the recessed portion 24 of the blade holder 10 on the other hand, when the slide means 28 is in the release position the blade holder 10 can pivot in both directions, so that not only the removal of the blade holder 10 from the traverse 11, but also the subsequently necessary remounting of the blade holder 10, are provided in essentially the same operating sequence.

The specification incorporates by reference the disclosure of German priority document 197 00 941.7 of Jan. 14, 1997.

The present invention is, of course, in no way restricted to the specific disclosure of the specification and drawings, but also encompasses any modifications within the scope of the appended claims.

What is claimed is:

1. A longitudinal cutting machine having a plurality of blade holders disposed on at least one traverse that extends over the length of said longitudinal cutting machine, comprising, for each blade holder, two spaced-apart claws for releasably holding said blade holder on associated profiled members of said traverse, wherein one of said claws is movable relative to said blade holder; and adjusting means for fixing said one movable claw in position on an associated one of said profiled members and relative to said blade holder, wherein when said adjusting means is loosened, then by means of a pivoting of said blade holder about one of said two claws, the other of said claws is released from its associated profiled member and said blade holder is removable from said traverse;

wherein said claws are provided with hook-shaped projections, and wherein said profiled members have a rectangular sectional shape, surfaces thereof that face away from one another being respectively provided with a recess for receiving said hook-shaped projections;

wherein said claws are symmetrical relative to one another and have an essentially U-shaped configuration for embracing an associated profiled member, wherein a first leg of said claws is provided with said hook-shaped projection and embraces that surface of said profiled member that is provided with said recess, and wherein a second leg that projects in the direction of said profiled member is shorter than said first leg and on an inner corner is provided with an inclined surface such that upon pivoting of said blade holder relative to said profiled member, said claws slide from and are released from said profiled member;

wherein said moveable claw, on that side thereof that faces away from said profiled member, is provided with an extension that is adapted to engage in a rectangular recessed portion of said blade holder, and wherein said extension, in the region of a center line thereof that intersects said profiled member, rests against a surface of said recessed portion to form an engagement point and from here is tapered in a trapezoidal shape toward both sides accompanied by the formation of free spaces in corner regions of said recessed portion so that said extension is pivotable in both directions about said engagement point in said recessed portion.

2. A longitudinal cutting machine according to claim 1, wherein a single rectangular profiled rail is provided, surfaces thereof that face away from one another each being provided with one of said recesses for receiving said hook-shaped projections of said claws.

3. A longitudinal cutting machine according to claim 1, wherein two spaced-apart profiled rails are provided as said profiled members having said rectangular section shape, and wherein surfaces thereof that face away from one another are each provided with one of said recesses for receiving said hook-shaped projections of said claws.

4. A longitudinal cutting machine according to claim 1, wherein said adjusting means that acts upon said movable claw comprises an adjusting screw and a linearly displaceable slide means that is supported on the one hand against said movable claw and on the other hand by means of an inclined surface against said blade holder, wherein said slide means biases said movable claw in a fixed position thereof against said profiled member and, by means of said adjusting screw, which effects linear movement of said slide means, is adjustable between its fixed position and a release position for said movable claw.

5. A longitudinal cutting machine according to claim 4, which includes a spring that is supported against said blade holder for biasing said moveable claw against said adjusting means.

6. A longitudinal cutting machine according to claim 1, wherein said blade holders are displaceably disposed on said traverse, and wherein ball bearings are disposed between glide surfaces of said profiled members and said claws.

* * * * *